US006745512B1

(12) United States Patent
Panzer et al.

(10) Patent No.: US 6,745,512 B1
(45) Date of Patent: Jun. 8, 2004

(54) PROCESS AND DEVICE FOR TREATING SEEDS

(75) Inventors: Siegfried Panzer, Dresden (DE); Klaus Gaber, Dresden (DE); Petra Müller, Kleinmachnow (DE); Marga Jahn, Kleinmachnow (DE); Joachim Pflaumbaum, Blankenburg (DE); Friederun Scholze, Quedlinburg (DE); Manfred Lange, Magdeburg (DE); Reiner Fischer, Quedlinburg (DE); Rainer Müller, Kleinmachnow (DE); Günter Motte, Potsdam (DE); Michael Leja, Quedlinburg (DE)

(73) Assignee: UBT Ingenieurbüro GmbH Quedlinburg, Quedlinburg (DE)

( * ) Notice: Subject to any disclaimer, the term of this patent is extended or adjusted under 35 U.S.C. 154(b) by 0 days.

(21) Appl. No.: 07/916,087
(22) PCT Filed: Jan. 31, 1991
(86) PCT No.: PCT/EP91/00183
§ 371 (c)(1), (2), (4) Date: Feb. 5, 1993
(87) PCT Pub. No.: WO91/11097
PCT Pub. Date: Aug. 8, 1991

(30) Foreign Application Priority Data

Jan. 31, 1990 (DE) ............................................ 3374 182
Jan. 31, 1990 (DE) ............................................ 3374 174

(51) Int. Cl.$^7$ ............................ A01G 7/04; C10H 21/16
(52) U.S. Cl. ............................ 47/1.3; 47/57.6; 47/57.7
(58) Field of Search ........................ 47/57.604, 57.605, 47/57.614, 1.304, 57.7, 57.6, 1.3

(56) References Cited

U.S. PATENT DOCUMENTS

| 1,252,105 A | | 9/1918 | Bosshard ..................... 250/434 |
| 3,862,325 A | * | 1/1975 | Plowman ..................... 424/283 |
| 3,901,807 A | | 8/1975 | Trump ........................ 210/198 |
| 4,633,611 A | * | 1/1987 | Schiller et al. ............... 47/1.3 |
| 4,798,723 A | * | 1/1989 | Dart et al. .................... 424/93 |

FOREIGN PATENT DOCUMENTS

| DE | 238715 | 9/1986 |
| DE | 242337 | 1/1987 |
| DE | 250456 | 10/1987 |
| GB | 908581 | 10/1962 |
| WO | WO 85/01878 | 5/1985 |

* cited by examiner

Primary Examiner—Elizabeth F. McElwain
(74) Attorney, Agent, or Firm—Birch, Stewart, Kolasch & Birch LLP

(57) ABSTRACT

Process and device for treating seeds in order to combat harmful organisms. According to the invention, in an initial stage of the process, the seeds are separated and distributed evenly in a free-fall process, subjected in a vacuum to irradiation by low energy electron beams and then immediately treated with fungicides and/or microbial antagonists or metabolic products and spores thereof and/or synergists.

11 Claims, 3 Drawing Sheets

PROCESS AND DEVICE FOR TREATING SEEDS

DESCRIPTION

The present invention relates to a process and a device for treating seeds to combat seed- and/or soil-borne harmful organisms. The process and the device according to the present invention are intended for the treatment of agricultural, horticultural or forestry seeds, in particular, for the treatment of grain. The present invention is especially suited for combating smut in wheat or barley in agricultural production.

FIELD OF THE INVENTION

With specific cultivated varieties of grain, it is known that the seeds are dressed against seed-borne fungal pathogens. A plurality of chemical and physical treatment methods are known for this purpose. As a rule, the chemical treatment is carried out with dressing agents that contain one or several active substances. However, the specific pathogens of wheat smut (Ustilago tritici) and barley smut (Ustilago nuda) as well as other seed-borne harmful organisms can only be combated effectively by means of combined preparations which normally consist of a mercury compound and, a systemically attacking agent or of mercury-free combined preparations and at least one systemically attacking agent.

It is known in this connection that highly toxic chemicals are used. These have a wide range of action and are based on mercury compounds and their area of attack is the surface and seed shell of the seed corn. The mercury-free dressing agents which have either a small or a wide range of action make it possible to combat harmful organisms colonizing the deep regions of the seed corn. Furthermore, one expects of the above-described dressing operation with chemicals that these also protect the seed corn against soil-borne harmful organisms by adhering to the seed corn. Apart from a high deposition rate, the application of these agents requires specific devices which satisfy the conditions of application.

The disadvantages inherent to chemical dressing reside in the toxicity of the employed agents for warm-blooded animals and man and in developing resistance phenomena that can be observed during prolonged use with respect to specific harmful organisms. on the other hand, mercury-free dressing agents are much more expensive. Resistance also increases due to the fact that the standard treating agents (pesticides) contain the same active substances or active substances of the same groups as the dressing agents. Another aspect of the chemical dressing agents regards the residues thereof in cultivated plants and the associated negative effects on human and animal organisms. The amounts needed as well as metabolic phenomena are here of great importance. Finally, the known methods and devices for the chemical dressing of seeds have often the disadvantage that the fungicidal potency of the dressing agents is not fully exploited and that there is a potential risk of phytotoxic damage to the seeds caused by overdosage. The latter is often due to the uneven deposition of the dressing agent on the seed corns.

It is also known that the dressing agent is applied to the seeds in vacuum (DD-PS 18 675, DD-PS 23 421). The vacuum simultaneously serves to combat grain smut in an improved way through the additional action of moist heat. Devices of this type have however not gained any great importance because the procedure is very time-consuming and only a relatively small throughput can be achieved. Such a throughput does not meet the requirements of an efficient technological procedure, in particular in central seed processing installations.

Hot-water dressing has become known as a physical dressing method for combating barley smut. Although this method is very acceptable from an ecological point of view, as it is non-toxic and no harmful residues are left, it is not very successful and has thus not proved to be very efficient in practice.

The use of ionized high-energy rays, such as gamma or X-rays, to combat microbial harmful organisms on seeds is not possible because the necessary radiation dose would have mutagenic or phytotoxic effects on the seeds.

Furthermore, it is known that low energy electron beams are used in vacuum or in a free atmosphere to combat seed-borne harmful organisms (DD-PS 242 337, DD-PS 238 715, U.S. Pat. No. 4,633, 611). The electron energy and the radiation dose are chosen such that microbial harmful organisms are killed on the surface or in the near surface layers of the seed corn (caryopsis) without any produce affecting action or phytotoxic effects on the germ.

Although such a method has the advantage that it does not create any toxic effects and does thus not present any danger to man or his environment, seed-transferrable harmful organisms are not or only partly combated in the deep layers of the corn and in the germ, respectively, and the seeds are exposed to the attack of soil-borne harmful organisms in an unchecked way. Therefore, when barley or wheat smut causing agents are combated, electron dressing is not efficient enough because these agents colonize the deep layers of the caryopsis.

Biological combating methods which employ microbial antagonists that are used against seed-borne harmful organisms are now described more and more often (AT-PS 360 274, DE-OS 33 11 071, EP-PS 255 774, U.S. Pat. No. 4 798 723, etc.).

Bacterial antagonists, such as Bacillus spp., Streptomyces spp., Pseudomonas spp. and fungal antagonists, such as Chaetomium spp., Gliocladium spp., Penecillium spp., Trichoderma spp. and others are used. However, the good fungicidal effects found under laboratory conditions at optimum temperatures of more than 20° C. are often not confirmed by outdoor tests, and there is considerable uncertainty about the effects thereof. To improve their efficiency, mixtures of microbial antagonists and fungicides were therefore used (see DE-OS 23 52 403, DE-OS 27 40 052, DD-PS 267 420).

At the present stage of the fight against harmful organisms by means of antagonists, it is regarded as a deficiency that the vitality and thus efficiency of these antagonists are limited by existing seed-borne harmful organisms, added fungicides with a wide range of action or unfavorable colonization conditions for the antagonists on the seed corn.

Finally, methods for the seed treatment with symbiotic microorganisms or mycorrhiza fungi have been suggested. It is the target of these measures to transfer microorganisms into the soil together with the seed corn. These microorganisms live in symbiosis with the useful plant or in the immediate vicinity thereof in the soil and provide important macronutrients for the useful plant through their metabolic products.

In this case, too, it might happen that above all seed-borne harmful organisms or fungicides with a wide range of action affect the development and thus efficiency of these microorganisms.

It is therefore the object of the present invention to provide a process of the above-mentioned type which is more effective in combating seed- and/or soil-borne harmful organisms and less harmful to the environment and permits a high throughput. Moreover, the process is meant to combat the harmful organisms on the seeds more efficiently, i.e. independently of the localization of the population of harmful organisms on the seed corn.

Furthermore, it is the object of the present invention to provide a device for treating seeds to combat seed-borne and/or soil-borne harmful organisms, with the device permitting a high throughput during the treatment of the seeds as well as a highly efficient treatment on all sides thereof in the combat against harmful organisms, i.e. independently of the localization of said organisms on or in the seeds.

As for the seed treating process, this object is attained according to the invention in that the seeds are subjected in immediate sequential order to a combined treatment with low energy electron beams and, thereafter, with active chemical substances and/or biological material.

Surprisingly enough it has been found that when the seed treatment to combat harmful organisms is carried out in two steps immediately following each other, namely the irradiation of the seeds with low energy electrons on all sides thereof in a first step and the immediately following treatment of the seeds irradiated in this way with an application of active chemical substances and/or biological material in a second step, this has a synergistic effect and produces an unexpectedly good result when seed- and/or soil-borne harmful organisms are combated. This surprisingly good effect of the process according to the present invention is explained by the fact that the low energy electron beams first help to combat the fungal harmful organisms on the surface and in the near surface region of the seeds or seed corns. Harmful organisms that have not been killed are sensitized in said regions and can more effectively be combated due to this sensitization immediately after electron dressing with active chemical substances and/or with biological material (especially microbial antagonists). When active chemical substances are used, it is possible to achieve a higher combating rate even if the amounts used are smaller. Since the sensitivity accomplished through electron dressing will not last forever, the procedure of treating the seeds in accordance with the invention in a continuous treatment process divided into immediately subsequent steps produces especially good results when harmful organisms are combated. Moreover, an improved deposition of the chemical and/or biological application and an improved depth action for chemical agents or microbial antagonists are achieved through the inventive process. The penetration depth can additionally be controlled through the selection of the pressure stage for the application of the active chemical substances and/or the biological material.

In a preferred embodiment of the present invention, the seeds are separated in a first step and moved through an irradiation chamber in a free-fall process and in vacuum, i.e. substantially evenly distributed in spaced-apart relationship, and are subjected, immediately thereafter in a second step, to an application with fungicides or the active substances and/or microbial antagonists thereof or the metabolic products and spores thereof and/or microorganisms (synergists) conducive to plant growth, possibly in conjunction with nutrients.

The seeds are preferably irradiated in the first step in a free-fall process in the irradiation region with quasi-monoenergetic electron beams on all sides, electrons of substantially reduced energy (scatter electrons) and plasma particles which act on the surface of the seed and a near surface layer outside the embryo.

In another preferred embodiment of the process of the invention the chemical and/or biological application of the second step is preferably carried out in vacuum, during the reduction of the vacuum after electron beam treatment of the seeds or under atmospheric pressure.

In case the treatment of the seeds is carried out after electron dressing in vacuum, a vacuum pressure is preferably chosen which corresponds approximately to the saturation vapour pressure of the application.

Other preferred embodiments of the process of the invention are shown in the remaining subclaims.

To attain the above-mentioned object with respect to the device for treating seeds to combat seed-borne and/or soil-borne harmful organisms, in particular to perform the above-explained process, the invention suggests a device which comprises an evacuated irradiation chamber into which the seeds can be introduced separately in a seed flow and through which the seeds are moved in a free-fall process, as well as electron beam generators for treating the seeds by spreading the electron beams in an irradiation region of the irradiation chamber, and at least one treatment chamber in flow communication with the irradiation chamber, connected to application devices for the chemical and/or biological treatment of the seeds.

The device preferably comprises an evacuated irradiation chamber with electron guns arranged thereon as well as feeders for the pressure-decoupled introduction and discharge of the seeds into and from the treatment chamber, furthermore a distribution device at an inlet point for the seeds into the irradiation chamber for separating the seeds, a fall shaft between the distribution means and an irradiation region of the irradiation chamber with at least two electron guns that are opposite to each other at the same level and with deflection devices which are used for spreading the electron beam and are assigned to the irradiation region, a treatment container, in particular a vacuum container, being in flow communication with the irradiation chamber downstream thereof via an intermediate feeder and comprising application devices for treating the seeds, which devices are preferably arranged inside the treatment container, and a supply vessel which is used for applying active chemical substances and/or biological material as well as microbial antagonists and is connected to the treatment container.

Other preferred embodiments of the device of the invention are outlined in the remaining subclaims.

Both with regard to the treatment of seeds with active fungicidal substances or agents and the treatment with antagonistic microorganisms and/or their nutrient broths, culture filtrates and antibiotic metabolic products following an irradiation of the seeds with low energy electrons, a surprising synergistic and increased effect was observed with respect to seed- and/or soil-borne harmful organisms without any produce-affecting phytotoxic effects. The low energy electron beam treatment in vacuum results in an advantageous predisposition to an essentially improved colonization of the seeds with used microorganisms or a permanent deposition of culture filtrates or antibiotic metabolic products on the seeds.

The present invention shall now be explained in more detail with reference to embodiments and accompanying drawings.

DETAILED DESCRIPTION OF THE INVENTION

Figure 1:
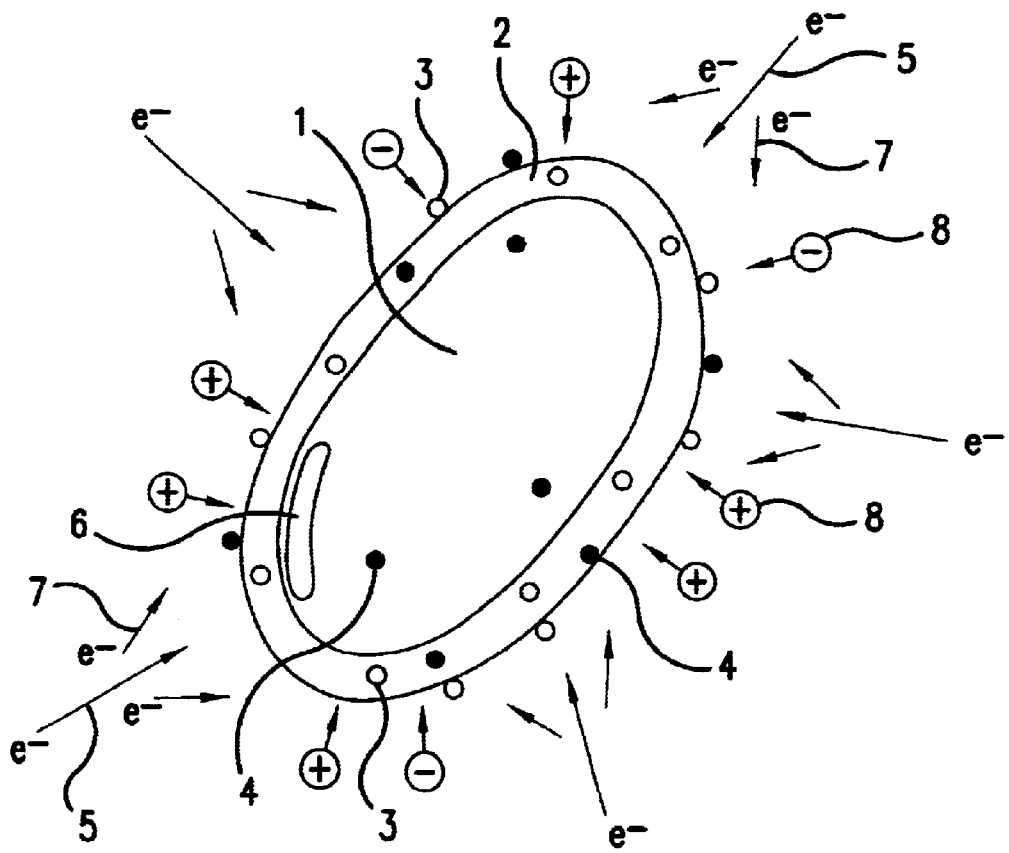
FIG. 1 is a diagrammatic sectional view of a seed corn with harmful organisms and charge carrier particles acting thereon.
Figure 2:
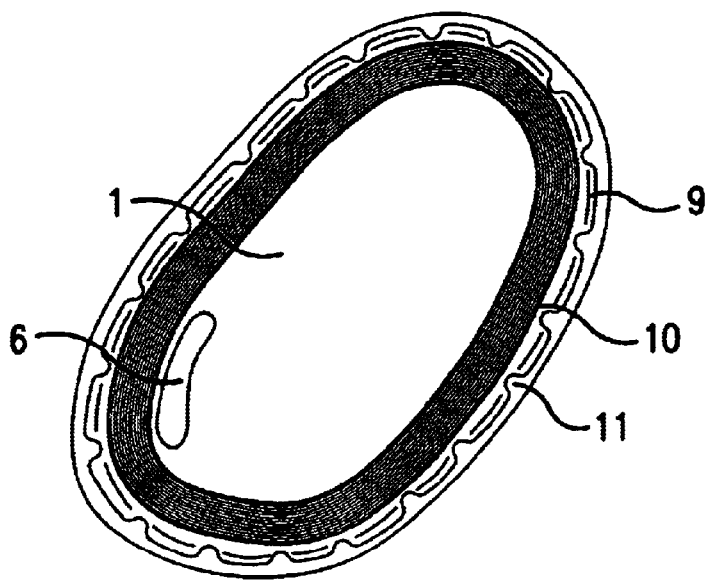
FIG. 2 shows a seed corn after treatment by the process of the present invention.

As diagrammatically shown in FIG. 1, seed corn 1, i.e. its surface as well as seed shell 2, accommodates various harmful organisms 3. Apart from this region, other harmful organisms 4 can be found inside seed corn 1. The surface of seed corn 1 and an adjacent near-surface layer are disinfected by irradiating seed corn 1 on all sides with quasi-monoenergetic electron beams 5. The thickness of this disinfected near-surface layer is determined by the electron energy and is chosen in response to the morphology of seed corn 1 in such a way that embryo 6 is not affected thereby. As illustrated in FIG. 2, an activated surface 9 which is positioned directly above the disinfected near-surface layer 10 is produced through the action of low energy scatter electrons 7 and of electron beams 5 and plasma particles 8 on all sides. With increasing evacuation pressure, the disinfecting effect is reduced and the activating effect increased. An evacuation pressure in the range of from 10 Pa to some 100 Pa is chosen in response to the respective irradiation task. An application layer 11 is applied to surface 9, which is activated by electron beams 5, directly following the near surface layer disinfection and surface activation. This application layer contains a fungicide specifically matched to the harmful organism 4, an active fungicidal substance or a formulated fungicide (or a combination of active substance and fungicide) which is also active in the inner region of seed corn 1, or contains one or more microbial antagonists that are preferably active against soil-borne harmful organisms as well, or microorganisms and nutrients conducive to plant growth. Application layer 11 may also contain a mixture of fungicidal agents and microbial antagonists, the metabolic products and spores thereof, or microorganisms and nutrients conducive to plant growth.

The combination of seed irradiation by low energy electrons with the deposition of antagonistic microorganisms effects a rapid and unhindered colonization by the microorganisms used according to the invention, which results in a high antagonistic activity. Used culture filtrates, or antibiotic products of metabolism, exhibit a high, long-lasting activity on and in the seed.

The use of an active fungicidal substance or agent after the irradiation of the seeds with low energy electrons results in an improved deposition of the chemical agent(s) on the seed corn. Moreover, an improved depth action can be achieved through the penetrating agent. The penetration depth of the agent can be controlled by selecting the pressure stage for the application of the chemical agents, which takes place directly after the irradiation of the seeds with low energy electron beams in vacuum.

In a preferred embodiment of the invention, the seeds are subjected in a first step to electron dressing in an evacuated irradiation chamber in which quasi-monoenergetic electron beams, electrons of a substantially reduced energy in comparison therewith (scatter electrons) and plasma particles act on all sides of the seeds. The seeds are introduced into the irradiation chamber via feeders. To achieve electron action on all sides of the seeds, these are separated upon entry into the irradiation chamber in such a way that they are evenly distributed throughout the whole cross-section of the irradiation. region and pass therethrough in a free-fall process. The plasma particles are generated and the corresponding conditions of action are created through a suitable inclusion of electron beams into the irradiation chamber evacuated at a constant working pressure in the range of from about 10 Pa to some 100 Pa. The surface of the respective seed and a near surface layer outside the embryo are disinfected with the quasi-monoenergetic electron beam. The seed surface is simultaneously activated with the low energy electrons and the plasma particles. This first step is immediately followed by an application step as the second step outside the evacuated irradiation chamber, with the application including active fungicidal substances or agents and/or microbial antagonists, the metabolic products and spores thereof, or microorganisms and nutrients conducive to plant growth in a mixture or with at least one of the above-mentioned components.

When an active fungicidal substance or agent is used, the same is preferably a biotic or abiotic fungicide with a specific effect against the seed-borne pathogen(s) living below the electron beam-disinfected near-surface layer of the seed corn. The microbial antagonists and/or the microorganisms conducive to plant growth are matched as to compatibility with the fungicide used if a mixture of an active chemical component and an active biological component is chosen. The microbial antagonists are moreover chosen with respect to their efficiency as to soil-borne harmful organisms.

A process in which the irradiation of seeds with low energy electrons is followed in an integral process by the treatment of seeds with bacterial and/or fungal antagonists shall now be explained with reference to FIG. 3 and the enclosed Table.

Effects of the colonization with antagonistic microorganisms on wheat grains after treatment with low energy electrons

| Harmful Organisms | Wheat grains without colonization | after treatment with low energy electrons | | | | | | | | | |
|---|---|---|---|---|---|---|---|---|---|---|---|
| | | 1 | 2 | 3 | 4 | 5 | 6 | 7 | 8 | 9 | 10 |
| Fusarium avenaceum | T | ++ | ++ | ++ | +++ | ++ | + | + | + | +++ | + |
| Fusarium culmorum | T | ++ | ++ | ++ | +++ | ++ | + | + | + | +++ | + |
| Fusarium graminearum | T | ++ | ++ | −, ü | +++ | −, ü | + | + | −, ü | +++ | + |
| Microdochium nivale | T | ++ | ++ | + | +++ | ++ | + | + | + | + | + |
| Septoria nodorum | ü | nu | nu | nu | nu | nu | + | + | + | +++ | + |
| Drechslera teres | ü | ++ | ++ | ++ | nu | ++ | + | ++ | + | +++ | + |
| Gaeumannomyces graminis | ü | ++ | ++ | ++ | +++ | +++ | + | +++ | ++ | +++ | + |

Legend:
nu = not tested
+++ = strong inhibition with distinct inhibition zone
++ = inhibition with distinct inhibition zone
+ = growth stop of harmful organism without inhibition zone
− = no effects
T = seed corn or embryo plant died off
ü = seed corn or embryo plant grown over and damaged
1 . . . 5 bacterial antagonists
(IMET 11 425)
(IMET 11 427)
(IMET 11 424)
(IMET 11 426)
(IMET 11 428)
6 . . . 10 fungal antagonists
(IMET 43 921)
(IMET 43 923)
(IMET 43 922)
(IMET 43 920)
(IMET 43 924)

Especially microbial antagonists such as Bacillus spp., Pseudomonas spp., Trichoderma spp., Chaetomium spp., Epicoccum spp., Penicillium spp. (IMET 11424, IMET 11425, IMET 11426, IMET 11427, IMET 11428, IMET 43920, IMET 43921, IMET 43922, IMET 43923, IMET 43924), yeasty microorganisms and other known antagonists against fungal harmful organisms are suited for this embodiment of the inventive seed treatment process. The above-mentioned bacterial and fungal antagonists were deposited at the Nationale Sammlung von Mikroorganismen (IMET), Institut für Mikrobiologie und experimentelle Therapie (National Collection of Microorganisms (IMET), Institute for Microbiology and Experimental Therapy), Beutenbergstraße 11, 0-6900 Jena, Germany (formerly Zentralinstitut für Mikrobiologie und experimentelle Therapie der Akademie der Wissenschaften der DDR (Central Institute for Microbiology and Experimental Therapy of the Academy of Sciences of the German Democratic Republic), DDR-6900 Jena, Beutenbergstraße 11).

The strains IMET 11424 through IMET 11428 were deposited on Dec. 7, 1989.

The strains IMET 43290, IMET 43921 and IMET 43922 were deposited on Dec. 7, 1989.

The strains IMET 43923 and IMET 43924 were deposited on Jan. 5, 1990.

The Table is a summary showing the protection of the germinating seed corn and the embryo plant before the attack of harmful organisms after electron beam treatment combined with the use of microbial antagonists. The action against the listed harmful organisms was determined after a test period of four weeks at a test temperature of 10° C. A strong protection of the seed corns that have been treated by the process of the invention, and of the resultant embryo plants, could be detected.

An embodiment of a device according to the present invention shall now be explained with reference to FIG. 3 which illustrates a device for electron dressing and subsequent treatment of the electron irradiated seeds with a chemical and/or biological application in vacuum or at atmospheric pressure or during the reduction of the vacuum after electron beam treatment.

An irradiation chamber 12 (recipient) can be evacuated via a connection 13 to a working pressure of about 10 Pa to some 100 Pa. The pressure graduating seed supply device 14 which consists of rotary vane feeders 15 and a connection 16 coupled to an evacuation device, in particular a vacuum pump, is connected at its inlet or upper side. The rotary vane feeders 15 simultaneously form a dosing means for seeds 17 which are supplied via a distribution means 18, which divides the seed flow in the direction perpendicular to the plane of projection in FIG. 1, to a fall shaft 19. In a free-fall process seeds 17 pass into and through an irradiation region 20. Irradiation region 20 is generated by two electron guns 21 that are radially opposite to each other by spreading electron beams 22 from electron guns 21 by means of scanner 23 via gun-internal beam deflection units in a two-dimensional manner. Seeds 17 which pass as a homogeneous seed flow through irradiation region 20 are irradiated in irradation region 20 approximately evenly on all sides due to a programmed raster of electron beams 22.

As becomes apparent from FIGS. 1 and 2, scatter electrons 7 which are scattered out of electron beams 22 at an increased energy loss, as well as plasma particles 8 formed by electron beam 22, activate the surface of seeds 17. The quasi-monoenergetic electrons 5 which remain in electron beam 22 and are only slightly scattered disinfect the near surface layer 10 of seed corns 1.

The end of irradiation chamber 12 is connected via an intermediate feeder 24 to a treatment chamber 25 which is e.g. formed as a vacuum container (recipient). This treatment container 25 is provided with an application device 26 for applying one or more fungicidal agents or just the active substances thereof or for applying microbial antagonists or other bacterial or fungal forms of microbiological components or a mixture of chemical/biological treatment material. The application is supplied via a supply vessel (not shown) via connections 27 and dosing and conveying means. The application is sprayed by means of the application device 26 and applied to seeds 17 through the spray. A pressure graduating seed discharge device 28 is provided at the outlet of treatment chamber 25. Preferably in accordance with the seed supply device 14, it consists of rotary vane feeders 15 and a connection 16 for establishing a connection with an evacuation device (vacuum pump). Seed entry into the seed supply device 14 and seed discharge from seed discharge device 28 take place at atmospheric pressure.

Of course, the application which consists of active fungicidal substances or agents or of microbial antagonists and of the above-explained other microbial application forms (or a mixture of fungicides and biological components to combat harmful organisms) can also be made to act on the seeds by immersing the seeds thereinto.

On the other hand, it is also possible to arrange a plurality of treatment chambers in sequential order, possibly at different pressure stages, for applying active fungicidal substances or agents or for applying antagonistic microorganisms (or mixtures thereof). Instead of a recipient as a treatment chamber 28 for the chemical and/or biological treatment of the electron-irradiated seeds in vacuum, said treatment can also be carried out under aeration (atmospheric pressure) or during the reduction of the vacuum after the electron beam treatment of seeds 17.

Figure 3:
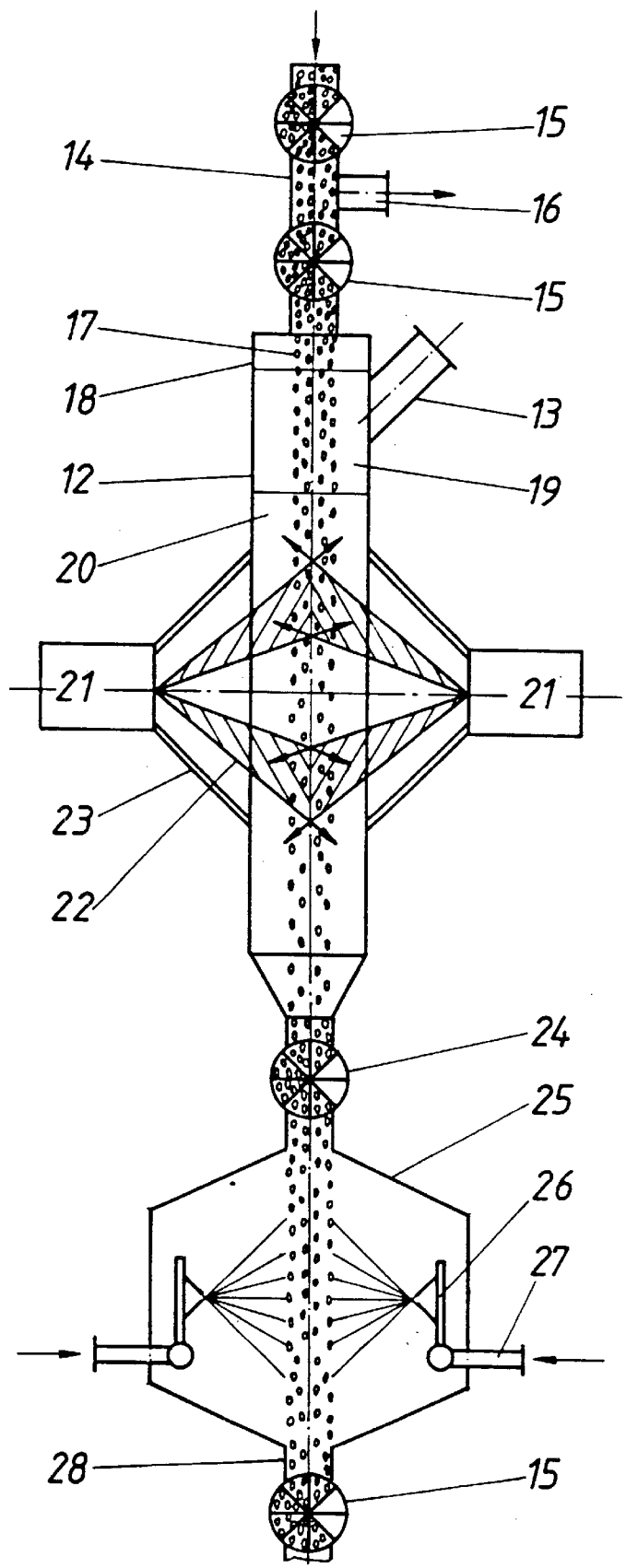
FIG. 3 is a diagrammatic longitudinal section through a device for carrying out the process.
Figure 4:
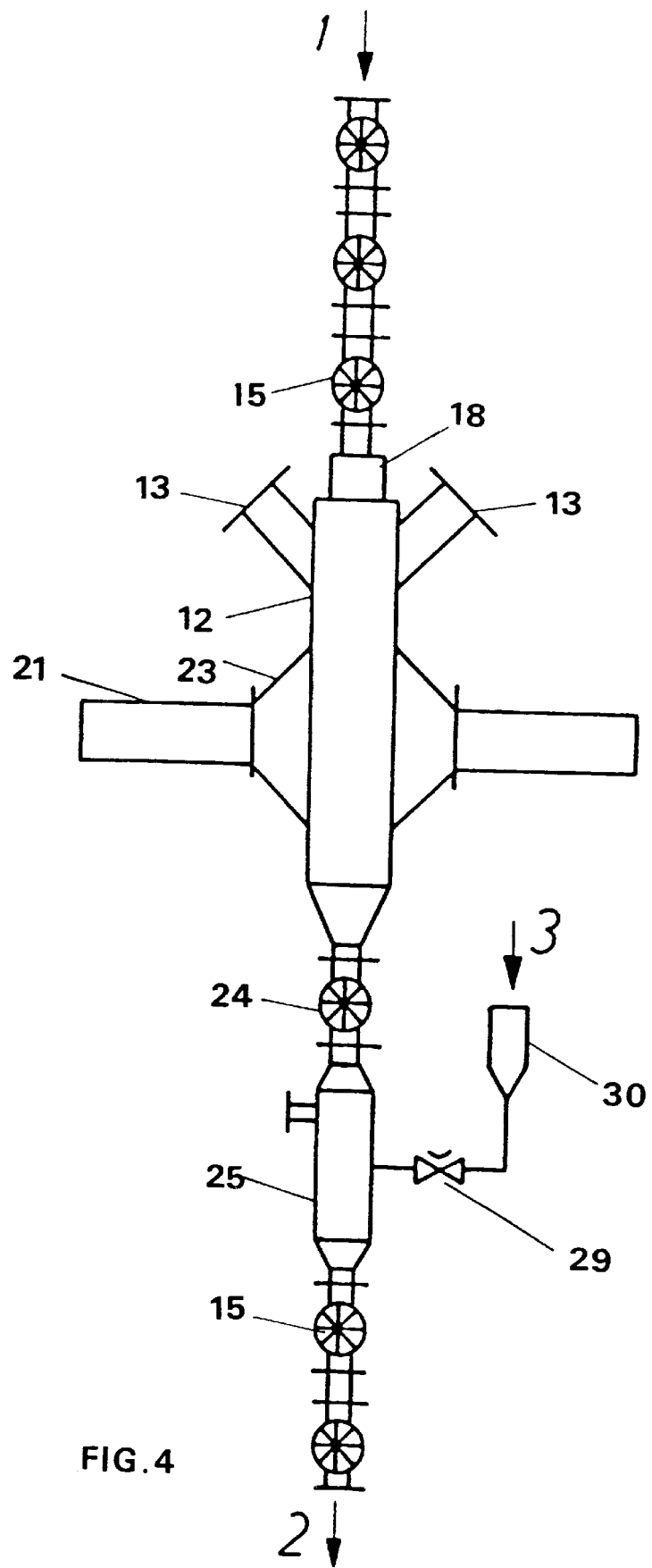
FIG. 4 shows a device similar to the one illustrated in FIG. 3 for treating seeds in accordance with the present invention.

With reference to FIG. 4, another embodiment of the present invention shall now be explained, namely a device for treating seeds with low energy beams in vacuum and a subsequent treatment of the irradiated seeds with fungicidal active substances or agents, the device corresponding substantially to the device illustrated in FIG. 3 from a constructional point of view. In this embodiment, too, the fungicides are applied immediately after the disinfecting and surface-activating irradiation of the seeds with low energy electron beams for an integral procedure in a continuous process with a seed flow continuing in the direction of arrows 1, 2.

In this embodiment of the present invention, a treatment chamber 25 is arranged downstream of the irradiation chamber 12 (recipient) between rotary vane feeders 15 and 24 in such a way that the desired pressure for the treatment of the seeds with active chemical substances or agents is obtained therein. In response to the amount of seeds moving through treatment chamber 25, the necessary amount of active substances is introduced via a dosing. device 29 into treatment chamber 25. Vacuum generators, e.g. at the pressure stages, which are provided at the inlet side of treatment chamber 25 for supplying the seed flow are not shown in the drawing.

In this embodiment, too, the seeds are each moved, like in the embodiment illustrated in FIG. 3, in a free-fall process through irradiation chamber 12 and through treatment chamber 25, with the seed corns being separated.

As a rule, the arrangement of a plurality of treatment chambers 25 in a sequentially vertical arrangement is also possible, whereby the penetration depth of active substances can be controlled during the use of a plurality of different active substances with the aid of the respective pressure prevailing in treatment chamber 25. In this case a separate dosing device 29 and a separate supply vessel 30 for the application material 3, in particular fungicides, are provided for each treatment chamber 25.

It has been found that harmful organisms such as smut (Ustilago nuda) and other harmful organisms penetrating deeper into the grain, e.g. various kinds of Fusaria and *Septoria nodorum*, can be combated successfully through the inventive procedure of treating seeds with low energy electrons and fungicides in accordance with this embodiment of the present invention.

In cases where the sole irradiation of seeds with low energy electrons (to avoid phytotoxic effects) for fighting harmful organisms that penetrate into the embryo of the seed, such as smut and partly also Fusaria, is not successful enough because of a depth action which is too small, great successes can surprisingly enough be achieved through the combined use of electron dressing with an immediately following treatment with active fungicidal substances in accordance with the invention.

It has been found that harmful organisms can be combated efficiently, i.e. 95 to 100%, through the combined use of low energy electrons with a subsequent fungicidal treatment of the seeds by Methfuroxam (15 g, 30 g/100 kg seeds). Similar effects can also be expected of the fungicides Guazatin (20 g, 40 g/100 kg seeds) Triadimenol (20 g, 40 g/100 kg seeds), Carbendazim (12 g, 15 g/100 kg seeds), Bitertanol (20 g, 20 g/109 kg seeds) and Carboxin (25 g, 50 g/100 kg seeds) as a combination partner following electron bream treatment. The amounts of fungicides used can further be reduced through the combination of fungicides with one another, and also through the use of Prochloraz, Imazalil, Fenfuram, Fuberidazol, Iprodion, Thiabendazol, in conjunction with a preceding electron beam treatment with low energy electrons.

We claim:

1. A process for treating seeds to combat seed and soil-borne harmful organisms which comprises subjecting said seeds to a first treatment with low energy electron beams and subsequently to a second treatment with at least one member selected from the group consisting of chemical and biological materials, active against said harmful organisms immediately after the electron beam treatment.

2. A process according to claim 1, wherein in said first step the seeds are separated and moved in a free-fall process under vacuum through an irradiation chamber in a substantially even distribution pattern and in a spaced-apart relationship and are, immediately thereafter, subjected in said second step to the application of at least one member selected from the group consisting of fungicides, microbial antagonists to said harmful organisms or the metabolic products and spores thereof and microorganisms or nutrients conducive to plant growth.

3. A process according to claim 2, wherein quasi-monoenergetic electron beams, electrons of considerably less energy than said quasi-monoenergetic electron beams and plasma particles are made to act on said seeds in said free-fall process in the irradiation region on all sides thereof, including on the surface of said seeds and in near surface layers of said seeds, outside the embryo.

4. A process according to claim 3, wherein the chemical or biological application of said second step is carried out either under vacuum or during the reduction of said vacuum after the electron beam treatment of said seeds or at atmospheric pressure.

5. A process according to claim 4, wherein said second step is carried out at a vacuum pressure which corresponds approximately to the saturation vapor pressure of the respective chemical or biological materials applied to said seeds in said second step.

6. A process according to claim 5, wherein in response to the selection of a pressure stage for the introduction of the chemical or biological materials, their use and penetration of their on and into the caryopsis are controlled.

7. A process according to claim 1, wherein the chemical or biological materials are introduced by means of a separate dosing device into a treatment chamber.

8. A process according to claim 1, wherein the chemical or biological materials are sprayed onto the seeds.

9. A process according to claim 1, wherein the chemical or biological materials are applied by immersing said seeds thereinto.

10. A process according to claim 6, wherein said operating pressure in said irradiation chamber is adjusted to about 10 Pa to several 100 Pa.

11. A process for treating seeds to combat seed- and soil-borne harmful organisms which comprises subjecting said seeds to a first treatment with low energy electron beams and subsequently to a second treatment, under vacuum, with at least one member selected from the group consisting of chemical and biological materials, active against said harmful organisms, immediately after the electron beam treatment.

* * * * *